United States Patent
Ranjan et al.

(10) Patent No.: US 9,558,052 B2
(45) Date of Patent: Jan. 31, 2017

(54) SAFE SCHEDULER FOR FINITE STATE DETERMINISTIC APPLICATION

(71) Applicants: STMicroelectronics International N.V., Amsterdam (NL); STMicroelectronics S.r.I., Agrate Brianza (IT)

(72) Inventors: Om Ranjan, New Delhi (IN); Giampiero Borgonovo, Seregno (IT); Deepak Baranwal, Greater Noida (IN)

(73) Assignees: STMicroelectronics International N.V., Amsterdam (NL); STMicroelectronics S.R.L., Agrate Brianza (IT)

( * ) Notice: Subject to any disclaimer, the term of this patent is extended or adjusted under 35 U.S.C. 154(b) by 409 days.

(21) Appl. No.: 14/218,482

(22) Filed: Mar. 18, 2014

(65) Prior Publication Data

US 2015/0268133 A1 Sep. 24, 2015

(51) Int. Cl.
| | |
|---|---|
| G06F 11/00 | (2006.01) |
| G06F 11/07 | (2006.01) |
| G06F 11/22 | (2006.01) |
| G06F 11/30 | (2006.01) |
| G05B 19/042 | (2006.01) |
| G05B 23/02 | (2006.01) |

(52) U.S. Cl.
CPC ....... *G06F 11/0736* (2013.01); *G05B 19/0428* (2013.01); *G06F 11/2205* (2013.01); *G06F 11/3013* (2013.01); *G05B 23/0254* (2013.01); *G05B 2219/2637* (2013.01)

(58) Field of Classification Search
CPC ... G06F 11/0736; G06F 11/0739; G06F 11/22; G06F 11/2005; G06F 11/30; G06F 11/3013; G05B 19/0428; G05B 23/0254; G05B 2219/2637
USPC .............. 714/37, 30, 33, 36, 38.1, 39, 47.1, 47.3, 714/50
See application file for complete search history.

(56) References Cited

U.S. PATENT DOCUMENTS

| | | | | |
|---|---|---|---|---|
| 6,456,946 B1 * | 9/2002 | O'Gorman | .......... | H02P 29/0241 702/58 |
| 2012/0066551 A1 * | 3/2012 | Palus | ................. | G06F 11/3636 714/39 |

(Continued)

*Primary Examiner* — Joseph D Manoskey
(74) *Attorney, Agent, or Firm* — Seed IP Law Group LLP

(57) ABSTRACT

A safety system monitors faults in an embedded control system. The embedded control system is modeled to produce one or more model check values by calculating how many clock cycles will pass between an initialization time point and at least one event time point for a specific event. The initialization time point is a certain point in an initialization function of a scheduler in the embedded control system. The at least one event time point is an expected number of clock cycles to pass before a specific event occurs. In operation, the embedded control system is initialized, a current clock cycle counter value is retrieved at a certain point in the initialization, and either an occurrence or an absence of an occurrence of a scheduled event is recognized. A current clock cycle value is recorded upon the recognition, and a mathematic check value is produced from the clock cycle value stored at the certain point in the initialization and the clock cycle value recorded upon the recognition. Subsequently, the model check value is compared to the mathematic check value, and action is taken based on the comparison.

19 Claims, 7 Drawing Sheets

(56) References Cited

U.S. PATENT DOCUMENTS

| | | | | |
|---|---|---|---|---|
| 2012/0197416 A1* | 8/2012 | Taira | ............... | G05B 9/02 |
| | | | | 700/14 |
| 2012/0272104 A1* | 10/2012 | Jacobi | ............... | F02D 41/22 |
| | | | | 714/47.1 |
| 2014/0082434 A1* | 3/2014 | Knight | ............... | G05B 19/0428 |
| | | | | 714/55 |

* cited by examiner

SAFE SCHEDULER FOR FINITE STATE DETERMINISTIC APPLICATION

BACKGROUND

Technical Field

The present disclosure generally relates to a scheduler in an embedded system and, more particularly, but not exclusively, relates to a safety mechanism to detect system faults within a short and definite time.

Description of the Related Art

Many machines include embedded microprocessors. The embedded microprocessors control sensors, actuators, interfaces, communications peripherals, and many other devices. For example, embedded microprocessors are found in industrial machines, building HVAC systems, motor vehicles, public utility meters, automated tollbooths, public water supply testing and filtration systems, and many other types of apparatus.

The embedded processors found in machines typically direct functional device modules of the machine to perform one or more actions. The actions may be electronic actions, software actions, algorithmic actions, mechanical actions or some other type of action. In many cases, the actions directed by the embedded processor are repetitive and predictable. Accordingly, the embedded processor may be configured to direct the actions via a finite state machine (FSM), a task loop, a task scheduler, a multitasking operating system, or via some other configuration.

In some cases, one or more parts of the machine will fail. When a failure occurs, sooner or later, the failure will become known. Some embedded systems are designed with error detection mechanisms, which may alert an operator to the failure or take actions in the machine to reduce the negative impact of the failure. For example, antilock braking systems in automobiles often have brake pad wear-sensors to alert a driver to brake pads that are thinning or otherwise wearing out or beginning to fail. Upon detection of a worn brake pad, the embedded system that controls the antilock braking system may illuminate a dashboard light, sound an audio alarm, or take some other action such as changing the way in which the antilock braking system operates the braking mechanism.

FIG. 1 is a block diagram representation of a conventional motor driven electric power steering (EPS) drive system 10. In such a system, certain sensors are mounted so that the position of the steering column relative to a known reference point can be detected. Other sensors are mounted so that the torque applied to the steering column can be detected. An embedded processor acts on the position and torque signals to produce pulse width modulation signals that drive one or more electric motors coupled to the steering mechanism of the automobile. In FIG. 1, two motors 12x, 12y are shown.

In the conventional motor driven EPS drive system 10, varying amounts of motor drive torque can be applied to the steering mechanism wherein the variation conforms to a particular pattern, curve, or other profile. For example, when a vehicle is moving slowly, the electric motor(s) may apply more torque to the steering mechanism in order to make low speed steering easier. When the vehicle is moving more quickly, the electric motor(s) may apply less torque to the steering mechanism. In this way, the motor driven EPS drive system 10 can be designed with any number of particular profiles to desirably match a selected set of driving conditions.

In the conventional motor driven EPS drive system 10 of FIG. 1, a first channel X is associated with the driver side steering mechanism of the left wheel of an automobile. A second channel Y is associated with the passenger side steering mechanism of the right wheel.

The conventional motor driven EPS drive system 10 includes two motors 12x, 12y, which are coupled to the steering mechanism of the automobile (not shown). The first motor 12x drives the steering mechanism of the left wheel, and the second motor 12y drives the steering mechanism of the right wheel. The operation of each motor 12x, 12y is driven by a respective pulse width modulation (PWM) drive circuit 14x, 14y.

One or more electronic or electromechanical sensors are utilized in the conventional motor driven EPS drive system 10 of FIG. 1. In the figure, the sensors are illustrated as respective encoders 16x, 16y coupled respectively to a motor 12x, 12y, a control module 18x, 18y, and an analog to digital control (ADC) module 22x, 22y. A scheduler 20 directs the operations of the conventional motor driven EPS drive system 10 components. Generally speaking, sensor inputs are provided to the ADC modules 22x, 22y. At the direction of scheduler 20, the control modules 18x, 18y process input signals from the various sensors (i.e., encoders 16x, 16y, ADC 22x, 22y, and the like), and produce output signals to the PWM modules 14x, 14y. Each PWM module 14x, 14y produces an output signal that is applied to its respective motor 12x, 12y, and the motors apply torque to the steering mechanism.

The motors 12x, 12y of FIG. 1 may be brushless permanent magnet (BPM) motors, alternating current induction motors (ACIM), permanent magnet synchronous motors (PMSM), or some other type of brush or brushless motor. One common example of a motor used in a conventional EPS drive system is an AC multiphase, multi-pole motor such as a three-phase motor with two-pole magnets.

To produce torque, most brush motors take advantage of the electromagnetic interaction between a stator field and a rotor flux. The amount of torque produced by the motor is a function of the alignment between these two domains, and the alignment is controlled by the current passed into the motor. Basically, when the stator field and the rotor flux are in alignment at 0°, the motor is in balance and inclined to stay in balance. When the two domains are in opposed alignment at 180°, the motor is in a cautious balance that is easily disrupted. Between 0° and 180°, the motor is not in balance and inclined to return to balance. The alignment between the stator field and rotor flux is adjusted by controlling the amount of current passed into the motor's armature, and the current is controlled with a simple, repetitive five step procedure: 1) Measure the current flowing in the motor, 2) Compare the current to a reference value, 3) Generate a difference signal, 4) Amplify the difference signal to create a correction signal, and 5) Apply the correction signal to the motor.

An AC brushless motor is structurally different from a DC brush motor. First, in the brushless motor, the positions of the permanent magnets and the electromagnets are swapped. Second, the brushless motor does not have a commutator, so the alignment between the rotor flux and stator field must be recognized and intelligently controlled with, for example, a control algorithm.

In spite of the structural differences, the control process to produce torque in a brushless motor bears similarities to that of the brush motor. In the brushless motor, the control process will regulate stator currents (rather than regulating rotor currents as in the brush motor). Also in the brushless motor, particular vector calculations and transformations of a reference frame are made to control the alignment between the multiple rotor flux and stator fields.

The current flowing through each stator winding of the AC brushless motor creates a magnetic field oriented along its axis at a specific angle. For example, in a three-phase motor, the windings are spatially configured such that the magnetic axis for each phase is spatially separated from each other phase by 120°. The magnetic fields, which are a function of the current in each winding, can be vectorally added together to create a net stator magnetic vector of a certain magnitude and angle. The operation of the motor can be controlled by controlling the currents in each phase (i.e., the currents in each winding).

In a first step of a procedure to control current in the brushless motor, the currents flowing in each phase (i.e., stator) winding of the motor are determined; typically with a combination of measurement and algebraic calculation. The current in a winding can be determined by measuring the DC bus current at a chosen interval during the PWM cycle, and the measurement can be used to reconstruct a current waveform for the phase.

In a second and third combined step, the reconstructed phase current is compared to a reference value. Different from the DC motor, however, the multiple phases of the AC motor are accounted for. That is, since there is no commutator on the AC motor, the alignment of each phase is determined, and the contribution component of each stator current that is producing a magnetic field orthogonal to the rotor flux at a particular instant in time is determined. The determined current components are then regulated in the same way as in the DC motor, which is in comparison to a threshold value and with the generation of a difference signal. The particular determination of stator current contributions producing the orthogonal magnetic field may be derived using information from precision sensors. For example, encoders $16x$, $16y$ may provide accurate information regarding the angle of the motor shaft relative to a reference point.

A fourth step of the control procedure creates a set of correction signals from the difference signals generated in the third step. The correction signals are applied to the PWM drive circuits and thus the motor windings in a fifth step.

Turning back to FIG. 1, an embodiment is described wherein motor $12x$ and motor $12y$ are three-phase, two-pole, alternating current induction motors (ACIM) configured as left and right motors in a conventional motor driven EPS drive system 10. In the embodiment, when the automobile steering wheel is rotated, a signal corresponding to the steering column rotation is produced and passed into control circuits $18x$, $18y$. The steering column input signal (not shown) is processed by the control circuits $18x$, $18y$ to produce input signals to PWM drive circuits $14x$, $14y$. The encoders $16x$, $16y$ produce analog output representations of the respective motor shaft position in accordance with each of the three windings of the motor. The analog output representations are passed into the respective ADC module $22x$, $22y$, and digital values corresponding to the analog output representations are produced. The digital values are passed to the control circuits $18x$, $18y$, combined with additional steering column input signals, and used to produce updated input signals to the PWM drive circuits $14x$, $14y$.

Summarizing the illustration of FIG. 1, each motor $12x$, $12y$ is controlled according to a feedback driven closed loop system. A particular set of measurement and calculation steps are repeated over and over according to a pattern set by the scheduler 20. The pattern may be repeated thousands of times per second.

If the conventional motor driven EPS drive system 10 of FIG. 1 should fail, the lives of people and the value of property are put at risk. For example, if one or both motors $12x$, $12y$ provide too little or too much torque assistance, a driver of the associated vehicle may not be able to steer effectively, and the vehicle may be involved in a collision. The collision may injure or kill people, and the collision will nearly always damage the vehicle and will likely damage other property too. The improper application of torque may be created by a failure of a motor, a sensor, or some other part of the system.

The conventional motor driven EPS drive system 10 does not illustrate any error detection, error correction, or other safety apparatus. Certain safety systems have been contemplated, however. For example, in one case, a copy of the electronic controls of the conventional EPS drive system 10 is created. That is, in the vehicle, alongside the EPS drive system 10, a second scheduler, second X and Y controllers, and second X and Y sensors are configured. As the vehicle is operated, both the actual EPS drive system 10 and the duplicate control system are operated. It is expected that both the actual system and the duplicate system will operate in unison. A separate detection mechanism monitors the operations of both systems so as to detect a lack of synchronous operation. If the two systems are out of sync, then an error is flagged.

Another safety system is described in U.S. Pat. No. 6,456,946 to O'Gorman entitled System and Method for Motor Fault Detection. The O'Gorman patent describes a system illustrated in his FIG. 3, which detects motor faults using a current sensor 328, filters 330, 332, and a controller 220. The current sensor is electrically connected to the filters (i.e., a band pass filter or a low pass filter), and the controller tunes the filters to a rotational frequency of a motor. The controller then selects an output signal conditioned by either the band pass filter or the low pass filter, compares the selected signal to a predetermined value, and detects a fault based on the comparison. The O'Gorman system relies on a precision resistor 328 (shown in his FIG. 4) or a Hall effect current sensor described in the specification to accurately detect current flowing in motor windings. A disruption in balanced current, which is contrasted in O'Gorman's FIGS. 8 and 9 to his FIGS. 10 and 11, indicates the presence of a short circuit fault in the motor.

BRIEF SUMMARY

A scheduler in an embedded system is monitored by a safety mechanism to detect system faults that manifest as a result of delays, errors, and other deficiencies in scheduled components of the system. The safety mechanism responds quickly in a definite amount of time.

In an embodiment, an embedded controller may be summarized as including: a functional logic module interface; a task scheduler module arranged to schedule a finite number of events of one or more functional logic modules accessible via the functional logic module interface; and a safety module, the safety module arranged to: monitor the finite number of events; incrementally create a mathematic check value, each increment based on at least one of the finite number of monitored events; compare the mathematic check value to a pre-computed model check value; and set a test result value based on the comparison.

In another embodiment, a safety system method to monitor faults in an embedded control system may be summarized as including: modeling the embedded control system to produce one or more model check values, the modeling including calculating how many clock cycles will pass between an initialization time point and at least one event time point, the initialization time point being a certain point in an initialization function of a scheduler in the embedded control system, the at least one event time point being an expected number of clock cycles to pass before an event occurs; initializing the embedded control system; storing a current clock cycle counter value at a certain point in the initialization; recognizing an occurrence or absence of occurrence of a scheduled event; recording a current clock cycle value upon the recognition; and producing a mathematic check value from the clock cycle value stored at the certain point in the initialization and the clock cycle value recorded upon the recognition; comparing the model check value to the mathematic check value; and taking an action based on the comparison.

In yet another embodiment, a non-transitory computer readable medium may be summarized as one having computer executable instructions thereon that, when executed, cause a processor to monitor an expected behavior of an embedded control system, the monitoring including acts including: storing a model check value, the model check value based on a plurality of model time stamps, each model time stamp representing a value of a counter taken at a certain point in a model of a finite state machine arranged to direct operations of a system under control; initializing the embedded control system; executing a plurality of tasks, the tasks directed by the finite state machine; storing a plurality of time stamps associated with an actual behavior of the embedded control system; calculating a mathematic check value using at least some of the stored plurality of time stamps; comparing the mathematic check value with the model check value; and directing an action in the embedded control system based on the comparison.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
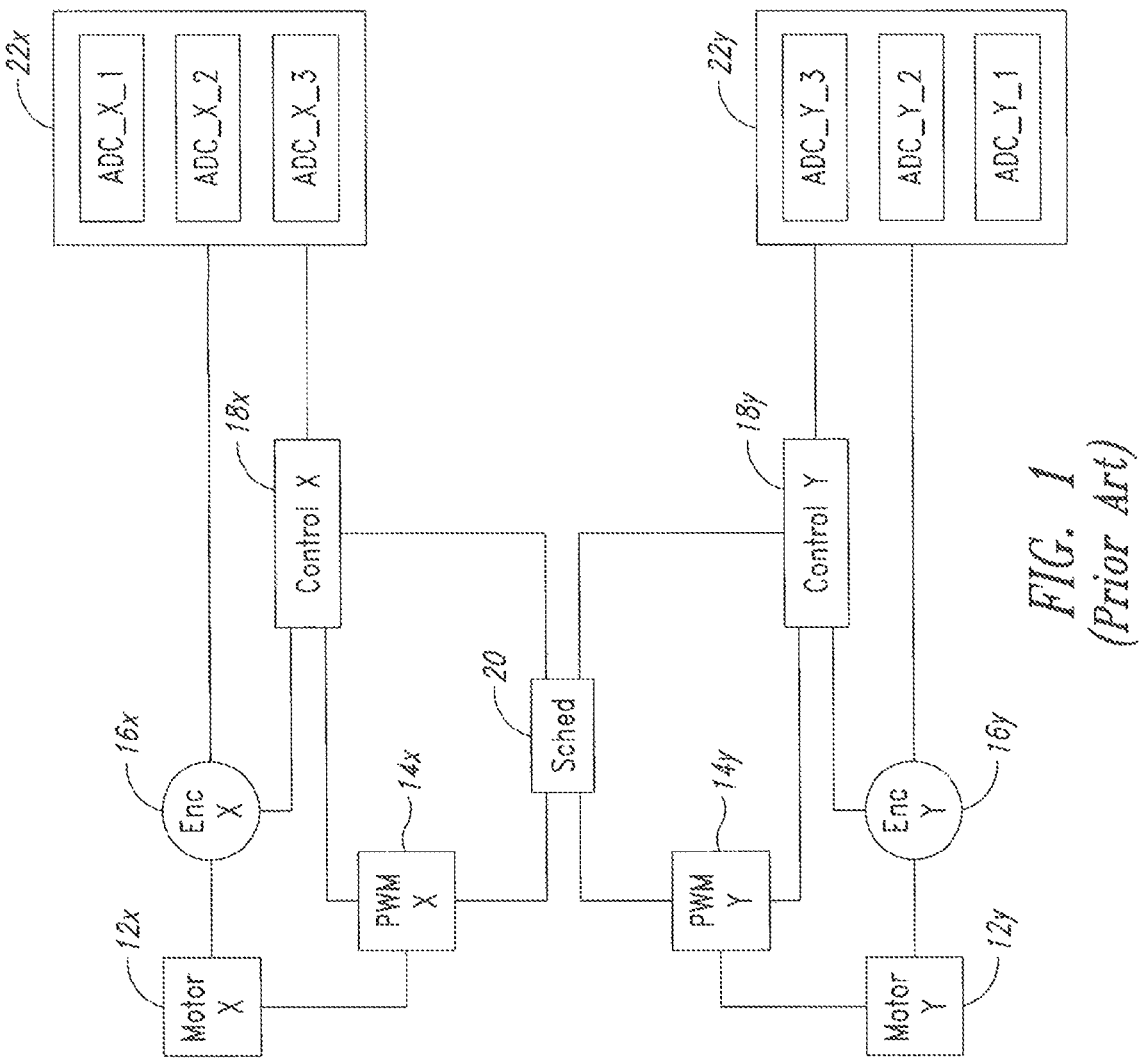
FIG. 1 is a block diagram of a conventional motor driven electric power steering (EPS) drive system.

Embedded systems are generally employed to control and monitor electronic and electromechanical modules. In some cases, the electronic and electromechanical modules that are controlled carry out critical functions, and if the critical functions fail or are not performed, safety is compromised.

In many embedded systems, a controller carries out the functions of the embedded system according to a reasonably strict schedule. Generally speaking, the functional modules of the embedded system receive inputs at predictable times and provide outputs at predictable times. The input values are typically known exactly or within a window of acceptable tolerance and the output values are expected to be known exactly or within a window of acceptable tolerance.

One example to consider is an embedded system that controls a motor. The embedded system will typically interrogate an encoder to learn the motor shaft position on a predictable schedule, and the output of the encoder will be within an expected range. An analog-to-digital controller (ADC) conversion to process the encoder output will be triggered on a predictable schedule, and the ADC conversion will complete at a predictable schedule.

In this exemplary embodiment, it is thus recognized that if a periodic counter is used to represent the schedule followed by the embedded system, then the events of the embedded system can be predicted to occur after a certain number of counts have elapsed. A first event in the embedded system can be associated by a "current" number of counts of the periodic counter. A second event in the system can be predicted to occur "x" counts after the first event, a third event in the system can be predicted to occur "y" counts after the second event, and so on. In this way, the counts of the periodic counter that elapse between events can be used to recognize whether the embedded system is functioning as expected. Further still, the sequence of elapsed count values can be evaluated in real time to keep a running status of the embedded system.

Hypothetical values can be applied to the exemplary embodiment to further illustrate the principle of the safe scheduler for deterministic application. If the periodic counter is operated at one megahertz (1 MHz), then the counter will increment every one microsecond (1 µs). If the first event commences when the counter has a value of 25,000, and if a second event is predicted to occur after nine milliseconds (9 ms), then the counter is expected to reach 34,000 when the second event is predicted to occur, i.e., x=9,000 counts because 9 ms divided by 1 µs=9,000. If the third event is predicted to occur after 7.225 ms, then the counter is expected to reach 41,225 when the third event is predicted to occur. In other embodiments, the periodic counter is operated at one kilohertz (1 KHz), 10 KHz, 10 MHz, or some other value.

In the exemplary embodiment, the predicted count values between the first event and the second event, and the predicted count values between the second event and the third event, can be used to test the operation of the embedded system. For example, if a subsequent pass of the system scheduler re-commences the first event when the counter has a value of 6,105, then the second event is predictably expected to occur 10,000 counts later, i.e., at 16,105. The third event is predictably expected to occur 7,225 counts after the second event, i.e., at 23,330. Armed with the foreknowledge of when particular events are predicted to occur, the safe scheduler for deterministic application can monitor the events and the retrieve values from the counter. If the events do not occur when predicted, the safe scheduler is able to trigger an indication of the failure.

As will be described herein, the safe scheduler for deterministic application may be formed with many different optional features. For example, the predictive behavior of the embedded system may be calculated separate from the embedded system itself. That is, an outside system may design a model operation for the embedded system and calculate model expected values for the events and the counter. The model values may be stored in the embedded system and used as comparison values against the actual measured values of the system. Alternatively, or in addition, the model values may be captured and measured by the embedded system itself. That is, during a particular mode of operation, the embedded system may identify events and capture counter values to store as model values, which are later used in real time.

As another example, the expected count values that elapse between chosen events may not necessarily be calculated to the level of granularity of the counter. In the hypothetical example described herein, the counter was operating at 1 MHz and thereby incrementing every microsecond. In some cases, the embedded system may be operating properly if the elapsed number of counts between two events is within a particular range or window. That is, if at least "x" counts elapse between the events but not more than "y" counts, then the system may be recognized as operating properly.

One more feature optionally found in the safe scheduler for deterministic application is a monitor of values calculated, generated, or otherwise produced by functional modules of the embedded system. For example, if one functional module is an ADC device, the ADC device may be expected to produce values between twenty (20) and eighty (80) percent (20-80%) of full scale. In this hypothetical example, when the ADC output is not between 20-80% of full scale, it is known that the system will be forced into an undesirable state. Accordingly, when an ADC conversion event is triggered, the optional monitor within the safe scheduler for deterministic application may test the ADC output. If the ADC output is not between 20-80% of full scale, an error may be triggered.

The safe scheduler for deterministic application may choose one or more mechanisms to monitor the operation of the embedded system. In some embodiments, an embedded system is modeled and a series of model "check values" are produced. The model check values may represent elapsed counter values or ranges, representations of values that fall within a chosen window, and the like. The model check values may be accumulated into one or more accumulated check values using a particular algorithm such as a checksum or cyclic redundancy check. In these cases, the accumulated check values can be stored in a memory device associated with the embedded system. Subsequently, the embedded system can calculate actual accumulated check values in real time as the embedded system operates. If the actual check values do not match the accumulated check values, then particular errors can be triggered.

In one example, an embedded system may be employed in a power steering mechanism of an automobile. The embedded system may control one or more motors, sensors, pumps, and other electronic or electromechanical modules that function in the power steering mechanism. If one or more of the modules of the mechanism fails, the power steering mechanism and perhaps the vehicle's steering itself may stop working too. The failure of the power steering mechanism may cause catastrophic loss of property and immeasurable injury or death to people. Accordingly, the ability to monitor and detect problems within the power steering mechanism is important.

Figure 2:
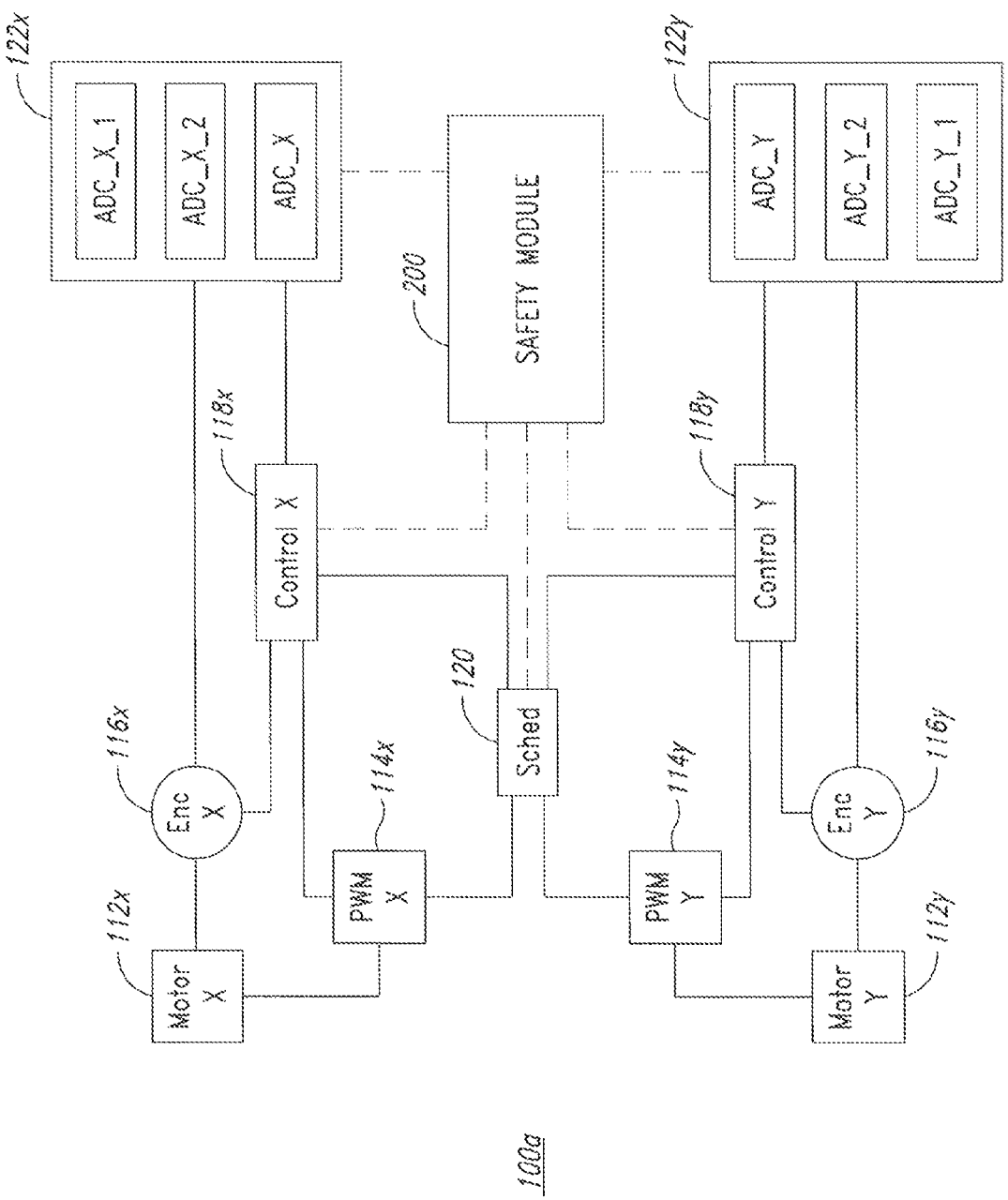
FIG. 2 is an embodiment of a power steering drive system having a safety module.

FIG. 2 illustrates an embodiment of an electric power steering (EPS) drive system 100a having a safety module 200. The EPS drive system 100a of FIG. 2 bears some similarities to the conventional motor driven EPS drive system 10 of FIG. 1. In particular, both systems include a scheduler, pulse width generation (PWM) drive circuits, motors, and sensors. The safety module 200 found in the EPS drive system 100a of FIG. 2 communicates data between itself and various modules.

As in the conventional motor driven EPS drive system 10 of FIG. 1, the EPS drive system 100a of FIG. 2 includes certain sensors (not shown) that provide position and torque information associated with the steering column. An embedded processor acts on the position and torque signals to direct PWM drive circuits 114x, 114y to produce signals for electric motors 112x, 112y. Electronic or electromechanical sensors 116x, 116y are coupled respectively to motors 112x, 112y, control modules 118x, 118y, and analog to digital control (ADC) modules 122x, 122y. A scheduler 120 directs the operations of the components of the EPS drive system 100a according to a desired profile.

The motors 112x, 112y of FIG. 2 are brushless permanent magnet (BPM) motors, alternating current induction motors (ACIM), permanent magnet synchronous motors (PMSM), or some other type of brush or brushless motor.

In one embodiment, motors 112x, 112y are three-phase, two-pole, alternating current induction motors (ACIM) implemented as left and right motors in the EPS drive system 100a of FIG. 2.

As the driver of the automobile having EPS drive system 100a steers the vehicle, signals corresponding to the steering column rotation are produced and passed into control circuits 118x, 118y. The control circuits 118x, 118y produce input signals to PWM drive circuits 114x, 114y. Motors 112x, 112y rotate in correspondence to signals generated by the PWM drive circuits 114x, 114y, which are applied at particular levels and at particular times. Encoders 116x, 116y produce analog output representations of the respective motor shaft position in accordance with each of the three windings of the motor. ADC modules 122x, 122y receive the analog output representations from the encoders 116x, 116y and produce digital values corresponding to the analog output representations. The digital values are passed to the control circuits 118x, 118y, combined with additional steering column input signals, and used to produce updated input signals to the PWM drive circuits 114x, 114y.

Safety module 200 is configured to monitor input information from control modules 118x, 118y, scheduler 120, and ADC modules 122. Safety module 200 will generally have access to additional information from various other modules (not shown) such as memory, clock circuits, power circuits, voltage and current level sensors, temperature sensors, pressure sensors, accelerometers, interrupt triggers, computational circuits, and the like. The information is related to the operations of the EPS drive system 100a. When the motors 112x, 112y are functioning as expected and without errors, certain predictable information such as current consumption, motor shaft position, timing characteristics, and other data related to the correct operation of the EPS is produced and analyzed by the safety module 200. On the other hand, when the motors 112x, 112y are not functioning as expected, the unpredictable operation may be detected by the safety module 200.

Figure 3:
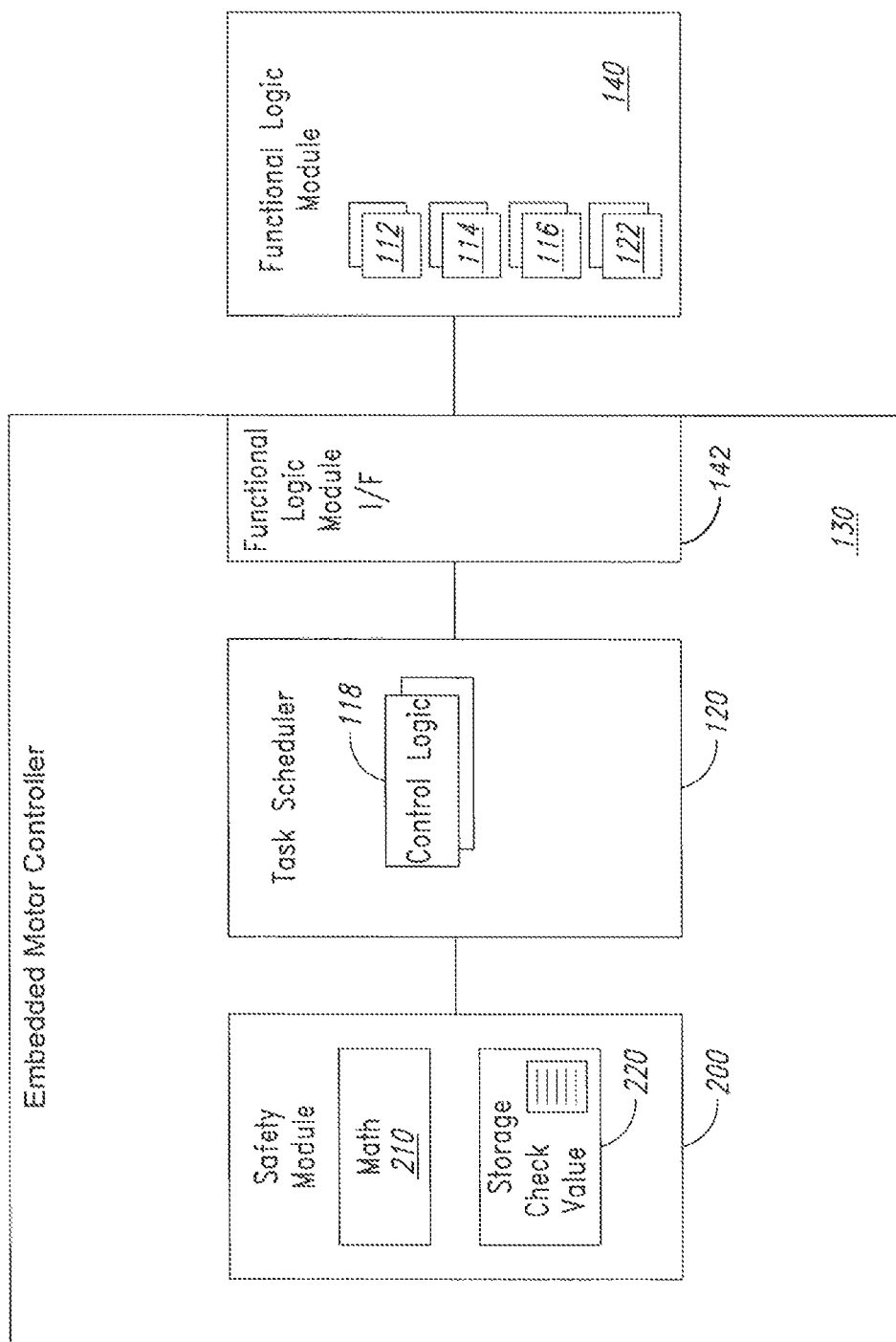
FIG. 3 is an embodiment of an embedded motor control system.

In FIG. 3, a safety module 200 is illustrated in another embedded motor control system 100b embodiment. The embedded motor control system 100b may be an electric power steering (EPS) motor control system or some other embedded motor control system. In the embodiment of FIG. 3, a plurality of external functional modules 140 are coupled to an integrated circuit 130.

The integrated circuit 130 of FIG. 3 has an embedded motor controller formed therein. The functional modules 140 coupled to the embedded motor controller may optionally include motors 112, PWM signal generators 114, encoders 116, ADC modules 122, and other functional modules such as sensors, control circuits, electronic devices, electromechanical devices, and the like.

Within the integrated circuit 130, a functional logic module interface 142 is configured to pass data and control signals between the embedded motor controller and the functional logic modules 140. The functional logic module interface 142 may include a single interface or a plurality of interfaces. The functional logic module interface 142 may further conform to one or more standardized protocols that direct the operation of hardware, software, or hardware and software. For example, the communication between the embedded motor controller 130 and the functional logic modules 140 may conform to a universal serial bus protocol, an IEEE protocol, a proprietary protocol, of an additional or different wired or wireless format.

The embedded motor controller of the integrated circuit 130 includes a task scheduler 120 and control logic 118 coupled to the safety module 200. In embodiments where the embedded motor controller is configured in an electronic power steering (EPS) system, the task scheduler 120 and control logic 118 perform the functions associated with the task scheduler 120 and motor control logic 118x, 118y of FIG. 2. In other embodiments, the task scheduler 120 and control logic 118 perform other functions. That is, the task scheduler 120 receives input from the various modules of the embedded system and directs the operations of the functional modules 140. The task scheduler may be configured as a finite state machine (FSM), a task loop, or even a multi-tasking operating system. Further, the control logic 118 may operate to retrieve data from functional modules 140, memory, or some other module of the system, and the control logic 118 may operate to store particular data.

The safety module 200 includes math logic 210, storage logic 220, and other logic to execute safety acts of the embedded motor control system 100b. The math logic 210 may include hardware, software, or a combination of hardware and software. The storage logic may include internal memory, external memory, register space, or some other storage repository.

Safety module 200 is configured to monitor runtime faults in the embedded motor control system 100b. In some cases, the safety module 200 also takes action upon detecting a fault such as providing one or more interrupts to a processor or some other control information to a functional logic module. In some cases, after a fault is detected, the action taken begins within a short, definite time such as ten milliseconds (10 ms). In another case, a fault detection algorithm may begin execution within one millisecond (1 ms) of a detected fault or even less.

An embedded controller typically involves a set of events that are predefined with respect to sequence and timing. The events encompass the operation of the functional modules 140 as directed by the task scheduler 120. The control logic 118 processes (e.g., retrieves, stores, acts on, and the like) information is associated with the system as necessary and may influence the operation of the task scheduler 120. The safety module 200 is configured to monitor the desired behavior of the functional modules 140 and the embedded controller 130. The hardware and software of the functional modules 140 and the embedded controller 130 may be monitored directly, indirectly, or some combination of indirect and direct monitoring may be arranged.

Embodiments of safety module 200 are arranged with elements of a model of the embedded control system that is being protected. In FIG. 3, safety module 200 is arranged with elements of a model of the embedded motor control system 100b. The elements include time stamps of particular events, sequences of particular events, and in some cases, values produced as a result of particular events.

Under normal circumstances, task scheduler 120 directs operations of control logic 118 and functional modules 140. In the case of an EPS drive system 100a (FIG. 2), the task scheduler directs the operations of PWM signal generation circuits, encoders, and ADC modules. The operations are performed according to a predictable sequence, and the values expected to be generated from certain ones of the operations may also be predicted. Accordingly, a safety module 200 can model the predicted operations and values. In such a system, the predicted values of safety module 200 can be analyzed against actual values produced in real-time by the EPS system to detect faults in the EPS drive system 100a.

One technique that may be used in safety module 200 is a computation of one or more mathematic check values. A mathematic check value may be a linear function value such as a checksum or a cyclic redundancy check (CRC) value, or the mathematic check value may be some non-linear function value.

In one example, a value from a global time source (e.g., clock) may be recorded at a particular point during an initialization phase of the embedded system controller. At a later point, a value from the same global time source is recorded when a certain event scheduled by the task scheduler indicates that a functional module has completed a task. Based on the number of counts of the global time source elapsed between the initialization and the completion of the event, a check value can be created. A predicted version of the check value may be available to the safety module 200, and the safety module 200 may calculate the actual check value in real time as the embedded system operates. Then, the safety module 200 may compare the predicted check value to the actual check value to determine if the embedded system is operating as it should.

In some embodiments, an entire embedded system is modeled with respect to its expected operation. That is, the number of expected clock counts between one or more events is predicted. The sequence of events is predicted. The range of the predicted values resulting from an event is predicted. Other operational characteristics may also be predicted. Based on the predictions, one or more check values can be created and stored for later comparison to actual check values.

Figure 4:
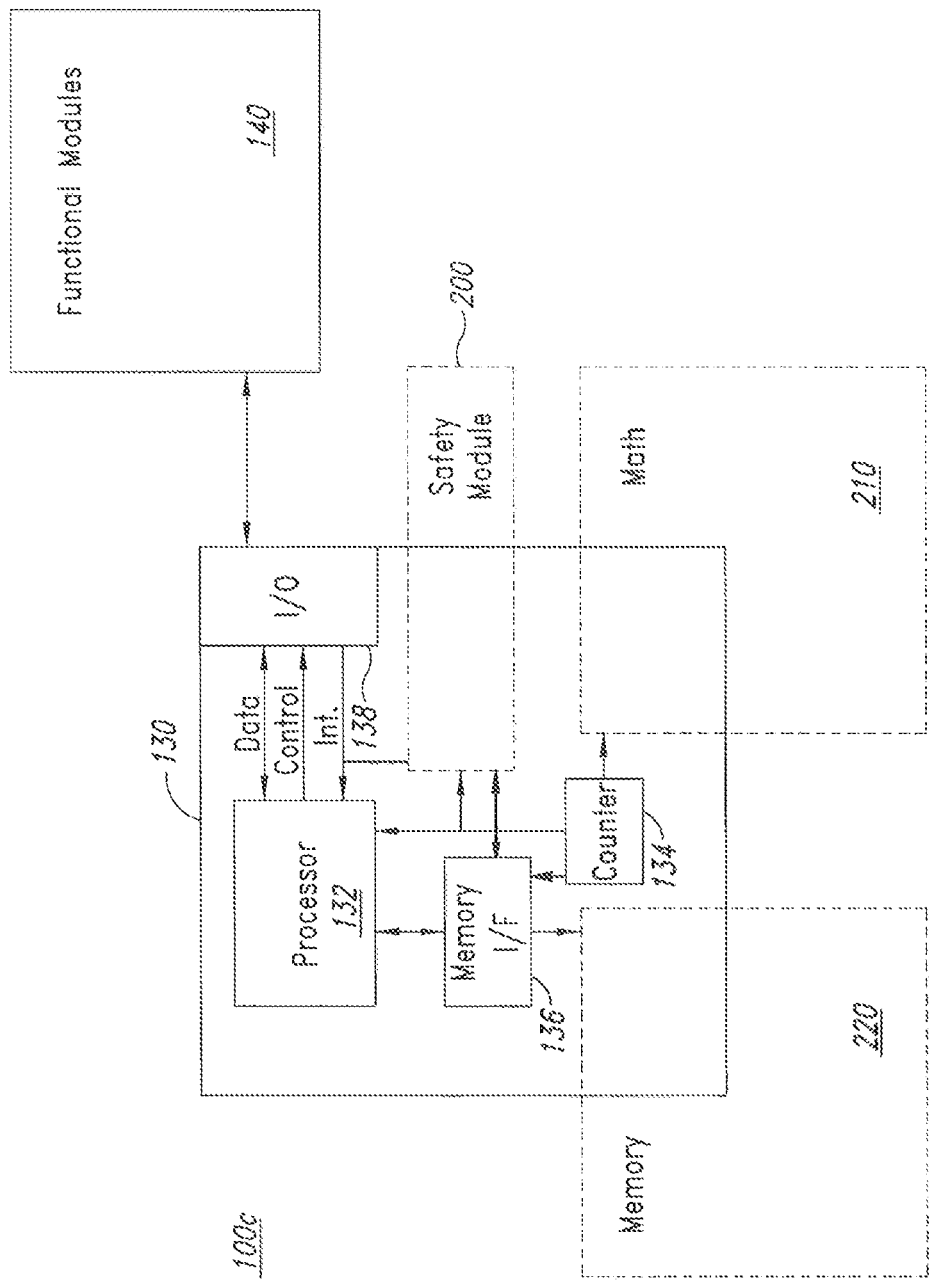
FIG. 4 is an embodiment of an embedded control system.

FIG. 4 is an embodiment of an embedded control system 100c. Similarities with the embodiments illustrated in FIGS. 2 and 3 are evident and certain modules of the embodiments of FIGS. 2 and 3 are also illustrated in the embodiment of FIG. 4.

The embedded control system 100c of FIG. 4 includes an integrated circuit 130 coupled to a plurality of functional modules 140. An input/output (I/O) interface 138 is arranged to monitor and direct the communication of data, control signals, and interrupt signals between the integrated circuit 130 and the functional modules 140.

The integrated circuit 130 of FIG. 4 further includes a processor 132, a time counting module 134, and a memory interface 136. Embodiments of the embedded control system 100c are configured with a safety module 200, a math module 210, and a memory 220. In optional combinations, some or all of the safety module 200, math module 210, and memory 220 may optionally be fully formed within the integrated circuit 130, partially formed within the integrated circuit 130 and partially external to the integrated circuit 130, and completely formed external to the integrated circuit 130.

Within the integrated circuit 130, various communication lines, buses, data paths, and other like conduits are illustrated as solid lines linking the various modules. The lines include arrows, which generally denote the direction of information flow. It is noted that other communication lines, buses, and data paths, etc. are not illustrated even though such conduits may exist, and in some cases, communication may flow in a direction opposite to an illustrated arrow. For example, control information is indicated in FIG. 4 as passing from the processor 132 to the I/O interface 138. In embodiments of the integrated circuit 130, other control information such as acknowledgement signals, flow control signals, and others may flow from the I/O interface 138 back to the processor 132. The other communication conduits may also have reverse flow signals as well. Furthermore, even though each communication conduit is illustrated as a single line, it is understood that the conduit may physically be formed with one or a plurality of signal paths.

As illustrated by the communication conduit lines in FIG. 4, the processor 132 is configured to communicate data to and from memory 220 via the memory interface 136. The processor is further configured to communicate data and control information via the I/O interface 138 to functional modules 140. The processor may be interrupted by one or more functional modules 140 or by the safety module 200. Count values from the time counter module 134 may be passed to the processor 132, the safety module 200, the math module 210, memory 220 via memory interface 136, and other circuits of the integrated circuit 130.

The processor 132 of FIG. 4 may be a single processing unit such as a microprocessor or a microcontroller, or the processing unit may be a formation of multiple processing units. The processor 132 may be or include one or more field programmable gate arrays (FPGA), application specific integrated circuits (ASIC), digital signal processors (DSP), central processing units (CPU), or other like devices. The processor 132 of an embedded control system may be broadly referenced herein as a CPU. That is, the processor 132 may be one or more of a microprocessor, a microcontroller, an FPGA, an ASIC, a DSP, a CPU, a finite state machine, or some other control processor device.

Memory 220 may include any combination of volatile and non-volatile non-transitory computer-readable media (CRM) for reading and writing data. Volatile computer-readable media includes, for example, random access memory (RAM). Non-volatile computer-readable media includes, for example, read only memory (ROM), magnetic-based memory, phase change memory, flash memory, and the like. Memory 220 may be formed within the integrated circuit 130, locally external to the integrated circuit 130, remotely external to the integrated circuit 130, or in some combination.

Stored in memory 220 may be a particular collection of software instructions executable by the processor 132 in order to carry out some functions of the embedded control system 100c. The software instructions operatively configure hardware and other software in the embedded control system 100c so that electronic data may be communicated to function modules 140, safety module 200, math module 210, memory 220, another embedded control system, or some other computing device. Information related to the embedded control system 100c may be stored in a file system in memory 220.

In some embodiments, memory 220 stores software instructions executable to carry out the actions of safety module 200. That is, the software instructions configure the safety module 200 to monitor input information from at least functional modules 140, a time counting module 134, and a scheduler 120 (FIGS. 2, 3) and further configure the safety module 200 to provide certain output information. The input and output information is related to the operations of the embedded control system 100c. The software instructions may be executed by processor 132, by the safety module 200, or cooperatively by both processor 132 and safety module 200.

In some cases, the operation of the safety module 200 is re-configurable. That is, the operation of safety module 200 may be arranged with one set of parameters and later re-arranged with another set of parameters. The parameters may include the software instructions stored in memory 220. The reconfiguration is arranged in some cases to be performed while the system is deployed, for example, after entry of certain security information.

The time counting module 134 may be a clock generation circuit such as a phase locked loop, a resistor/capacitor (RC) circuit, a crystal based oscillator, or some other periodic signal generator. The time counting module 134 is configured to generate a periodic signal used as a counter or clock by other modules in the integrated circuit 130. In some cases, the frequency of the time counting module 134 is configurable. The time counting module 134 may optionally, and in some cases configurably, count up or down.

In many cases, the time counting module 134 will include a time count register of "n" bits wherein "n" is an integer greater than one. For example, the time counting module 134 may include a 16-bit register (i.e., n=16). In such case, the time counting module 134 is identified as a 16-bit counter. A 16-bit counter embodiment will sequentially count between 0 and 65535, which in hexadecimal notation is between 0x0000 and 0xFFFF. For example, a 16-bit up-counting time counting module 134 will begin at 0 and sequentially count upwards until the counter reaches 65535 (0xFFFF). Conversely, a 16-bit down-counting time counting module 134 will begin at 65535 (0xFFFF) and sequentially count down until the counter reaches 0 (0x0000). Upon reaching its terminal value, the next increment of the counter will roll over from 65535 (0xFFFF) to 0 (0x0000) or from 0 (0x0000) to 65535 (0xFFFF) as the case may be, and the counting will continue. In other embodiments, "n" is equal to 8, 32, 64, or some other integer.

Numerical values retrieved from the time counting module 134 may be referred to as time stamps, count values, or the like.

The memory interface 136 is configured to communicate data between the processor 132 and the memory 220. In some cases, the memory interface 136 is a synchronous memory interface. In some cases, the memory interface 136 is an asynchronous memory interface. Other interface configurations are also possible. The memory interface 136 enables modules within the integrated circuit 130 to read data from memory 220 and write data to memory 220.

Math module 210 in FIG. 4 may include dedicated or shared hardware configured to carry out mathematic operations. In addition, or in the alternative, the math module 210 may direct the execution of particular software instructions that execute mathematic functions. In some cases, the software instructions are executed by processor 132, and in other cases, the software instructions are executed by a processor (not shown) within the safety module 200.

The math module 210 is configured to generate one or more mathematic check values based on one or more events monitored by the safety module 200. In some cases, each check value is calculated from scratch by the application of one or more mathematic formulae. In one case, the mathematic check value may be generated by calculating an elapsed number of period counts between a first event and a second event. For example, a desirable check value evaluates a successful ADC event. In this case, a current count of a global counter (e.g., time counting module 134) is captured when the ADC conversion event is triggered and a current count of the global counter is captured when an indication that the ADC conversion event completes. The number of counts between the first captured value and the second captured value can then be treated as the calculated check value or can alternatively be used to create the calculated check value. The calculated check value may be a mere subtraction of the first captured value from the second captured value. The calculated check value may alternatively be adjusted to account for a roll-over of the global counter.

In some cases, one or more mathematic formulae are applied to incrementally calculate certain check values using previously calculated or captured values such as check values. Generically speaking, the math module 210 may retrieve a determined number of iterations m, configure a variable n to incrementally count from 1 to m, each count associated with one iteration, detect an nth one of a finite number of monitored events during each iteration, record a time value (e.g., a value from time counting module 134) associated with the nth one of the finite number of monitored events, and perform a linear function on the recorded time value associated with the nth one of the finite number of monitored events. An incremental check value calculation is represented in Equation 1.

$$\sum_{n=1}^{n=m} \text{If } Event_n = \qquad\qquad\qquad\text{Equation 1}$$
$$TRUE_i[CheckValue \mathrel{+}= F\{Count_n = CurrentGlobalCount\}]$$

The function performed to produce the check value may include a linear function, a non-linear function, or a combination of linear and non-linear functions. For example, the checksum or modulus calculations may be used to produce check values. Cyclic redundancy check (CRC) functions, encryption functions, or other functions may also be used to produce check values. In some cases, multiple functions are accumulated as illustrated in Equation 2.

$$\sum_{n=1}^{n=m} \text{If } Event_n = \qquad\qquad\qquad\text{Equation 2}$$
$$TRUE_i[CheckValue \mathrel{+}= \{F(x_1) + F(x_2) + F(x_3) \ldots \}]$$

In still other cases, a function executed to generate a check value is merely a storage function wherein no mathematic or algorithmic transformation is performed. One example of such an example is illustrated in Equation 3.

$$\sum_{n=1}^{n=m} \text{If } Event_n = TRUE_i[CheckValue = \{CurrentGlobalCount\}] \qquad\text{Equation 3}$$

Upon creation of the check value by the math module 210, the check value will be stored. In some cases, the check value is stored in local storage of the math module, such as in a register. Check values may alternatively or in addition be stored in memory 220.

Figure 5:
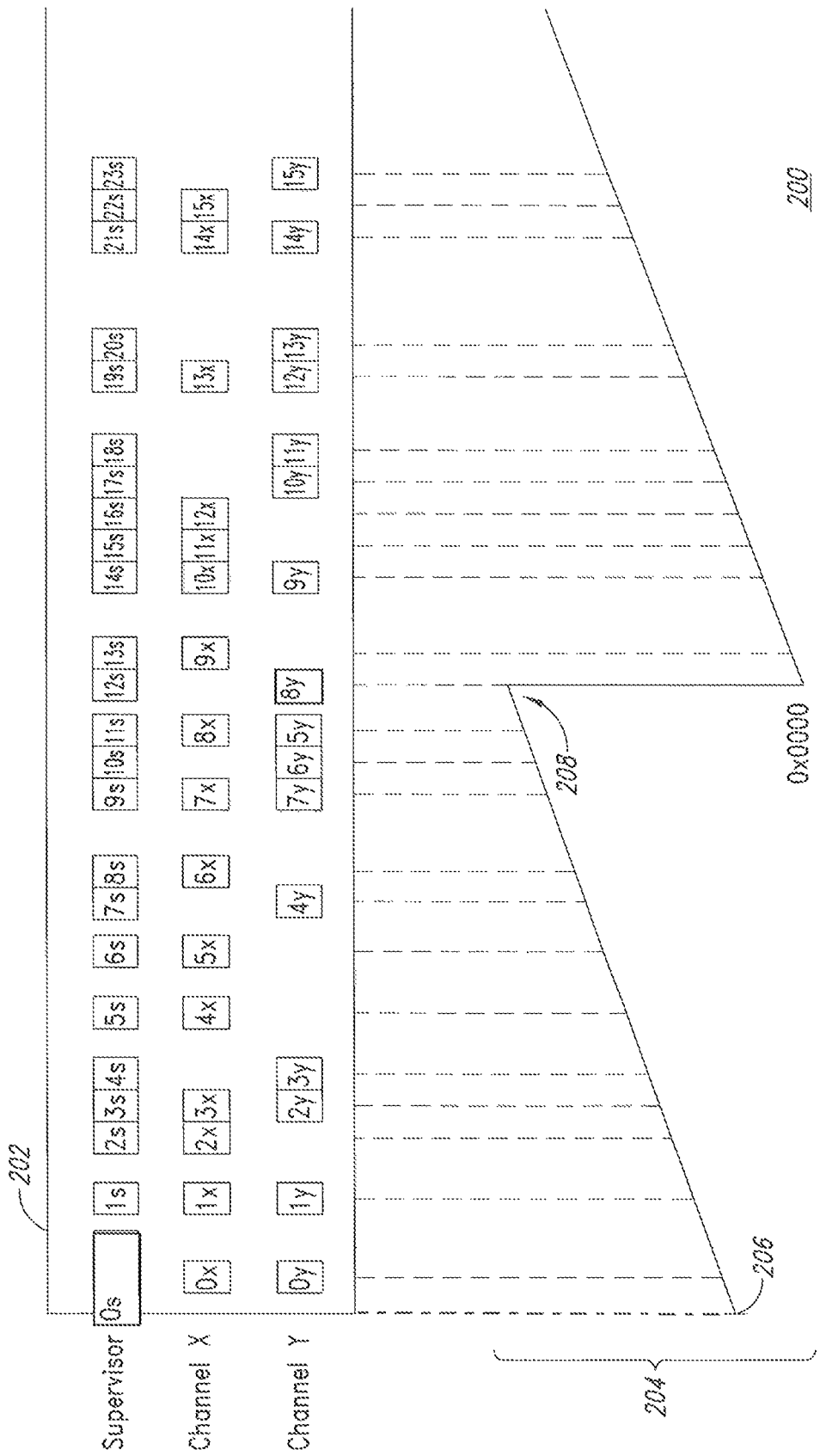
FIG. 5 illustrates a model task scheduler embodiment represented within a safety module.

FIG. 5 illustrates a model task scheduler 202 embodiment represented within a safety module 200. In some cases, the task scheduler model 202 is created outside of the embedded system and model check values representing the task scheduler model are stored in the embedded system. In other cases, the task scheduler model 202 is created by the safety module 200.

The task scheduler model 202 is associated with values retrieved from a global counter 204. In FIG. 5, the global counter is a 16-bit up-counting global counter, but other data-widths and counter types are also considered. An initial value 206 of the global counter is identified, which is captured when the task scheduler model 202 is initialized. A rollover point 208 of the global counter is identified when the global counter reaches its maximum value (i.e., 0xFFFF) and rolls over to its minimum value (i.e., 0x0000) upon the next increment. The global counter may be the counter module 134 illustrated in FIG. 4 or some other counter. In the embodiment of FIG. 5, the global counter is operated at 500 KHz. Accordingly, each sequential increment of the global counter represents an elapsed time of 2 µs.

The task scheduler model 202 of FIG. 5 represents a predicted finite state machine execution of operations in an embedded system, for example, in one or more of the embedded systems illustrated in whole or in part of FIGS. 2-4. In the task scheduler model 202, particular events are captured as related to "Channel X," "Channel Y," and a "Supervisor." With respect to the EPS drive system of FIG. 2, for example, operations of motor X 112x may be associated with Channel X, operations of motor Y 112y may be associated with Channel Y, and operations of the scheduler 120 may be associated with the Supervisor.

As illustrated in FIG. 5, various events (e.g., 0s, 0x, 0y, 1s, 1x, . . . ) are identified within the model 202. The model 202 presents the events in a particular sequence. In addition, the incrementing global counter 204 is illustrated in a saw-tooth pattern that reaches a peak and then recycles to an initial value wherein values of the global counter 204 are applied as time stamps to the specific sequence of events in the model 202.

The embodiment of FIG. 5 is non-limiting and illustrative of a particular model in a safe scheduler for deterministic application. The events are labeled as a sequence of successive integers, which helps to illuminate the concept that each specific event and the relative order of each specific event can be captured by the model. Furthermore, a relative time distance between each specific event can also be captured by the model.

By the illustration of FIG. 5, it is understood that a model in a safe scheduler for deterministic application can be used to validate the integrity of an embedded control system. In this respect, validating the integrity of the system may include tracking any one, two, or all three of the occurrence of specific events, the sequence of the specific events, and the timing of the specific events. Stated differently, some embedded systems may only be concerned that specific events have occurred. In this case, model 202 of FIG. 5 can be applied merely to include the desired events. In some other case, the sequence of events may also be important, and in that case, model 202 can be applied to include the events and their relative sequence. In still other cases, a timing of events occurring is modeled, but the specific event or sequence of events is not a concern.

Table 1 represents an exemplary set of features associated with the task scheduler model 202 of FIG. 5. The features illustrate predicted event timing in the embedded system. "Supervisory Events" (Sup. Ev.) are listed in the first column of Table 1 wherein the event numbers 1-23 are identified and appended with "s" to indicate "Supervisor." "Channel Events" (Ch. Ev.) are listed in the second column wherein event numbers 1-15 are identified and appended with "x," "y," or "s" to correspond, respectively, to Channel X, Channel Y, or Supervisor.

TABLE 1

Event timing and values table

| | Sup. Ev. | Ch. Ev. | Global Counter Window | Event Notes |
|---|---|---|---|---|
| 1 | 0s | — | Init = | Initialization value 206 of FIG. 5 |
| 2 | 0s | 0x | Init + [0x07D0-0x09C4] | Ch. X init trig, Y = 0x33CC, N = 0xCC33 |
| 3 | 0s | 0y | Init + [0x07D0-0x09C4] | Ch. Y init trig, Y = 0xAA55, N = 0x55AA |
| 4 | 0s | 1s | Init + [0x157C-0x1770] | Init complete, Y = 0x0011, N = 0x1100 |
| 5 | 1s | 1x | 0x + [0x1D00] | Channel X initialization complete |
| 6 | 1s | 1y | 0y + [0x1D00] | Channel Y initialization complete |
| 7 | 2s | 2x | 1x + [0x1500-0x1650] | Channel X Encoder value reported |
| 8 | 3s | 3x | 1x + [0x1650-0x1850] | Channel X PWM output reported |
| 9 | 3s | 2y | 1y + [0x1500-0x1650] | Channel Y Encoder value reported |
| 10 | 4s | 3y | 1y + [0x1650-0x1850] | Channel Y PWM output reported |
| 11 | 4s | 4x | 4s + [0x1300-0x1350] | Channel X ADC_1 request |
| 12 | 5s | 5x | 5s + [0x1300-0x1350] | Channel X ADC_2 request |
| 13 | 6s | 4y | 6s + [0x1300-0x1350] | Channel Y ADC_1 request |
| 14 | 7s | 6x | 4x + [0x3000] | Channel X ADC_1 read complete |
| 15 | 8s | 7x | 3x + [0xC000] | Channel X PWM feedback received |
| 16 | 9s | 7y | 3y + [0xD000] | Channel Y PWM feedback received |
| 17 | 10s | 6y | 4y + [0x3000] | Channel Y ADC_1 read complete |
| 18 | 9s | 5y | 9s + [0x1300-0x1350] | Channel Y ADC_2 request |
| 19 | 8s | 8x | 8s + [0x3000-0x3100] | Channel X ADC_3 request |
| 20 | 9s | 8y | 9s + [0x3000-0x3100] | Channel Y ADC_3 request |
| 21 | 11s | 9x | 5x + [0x5000] | Channel X ADC_2 read complete |
| 22 | 12s | 10x | 12s + [0x2800-0x2950] | Channel X PWM output reported |
| 23 | 13s | 9y | 5y + [0x3200] | Channel Y ADC_2 read complete |
| 24 | 14s | 11x | 8x + [0x4500] | Channel Y ADC_3 read complete |
| 25 | 15s | 12x | 15s + [0x0400-0x0450] | Channel X ADC within range test |
| 26 | 14s | 10y | 14s + [0x2800-0x2950] | Channel X PWM output reported |
| 27 | 16s | 11y | 8y + [0x4500] | Channel Y ADC_3 read complete |
| 28 | 16s | 13x | 16s + [0x2000-0x2200] | Channel X ADC reset/refresh |
| 29 | 18s | 12y | 18s + [0x0400-0x0450] | Channel Y ADC within range test |
| 30 | 17s | 13y | 17s + [0x2000-0x2200] | Channel Y ADC reset/refresh |
| 31 | 19s | 14x | 19s + [0x1700-0x2100] | Channel X Encoder value reported |
| 32 | 20s | 14y | 20s + [0x1700-0x2100] | Channel Y Encoder value reported |
| 33 | 21s | 15x | 21s + [0x0C00-0x0D00] | Channel X PWM feedback received |
| 34 | 22s | 15y | 22s + [0x0C00-0x0D00] | Channel Y PWM feedback received |
| 35 | 23s | — | 2s + [0x2000-0x2200] | Return to top of scheduler loop |

The "Global Counter Window" column in Table 1 expresses predicted model values in an algorithmic way. In a memory system, model check values corresponding to values in the Global Counter Window column may include merely the value itself, and not the algorithm. Additionally, model check values stored in memory may be stored before, after, or both before and after an algorithmic function (e.g., a checksum, a CRC, and the like) has been applied.

The "Event Notes" column in Table 1 expresses particular details of each modeled event.

The first active row of Table 1 represents values corresponding to the supervisory initialization event 0s of the task scheduler model 202 of FIG. 5. The 16-bit up-counting global counter is interrogated, and the value retrieved at 206 is stored in a memory location associated with the Table 1 variable "Init." If the global counter was interrogated at a different time, the value stored in the variable Init would be different.

Upon initialization, the scheduler triggers initialization sequences for Channel X and Channel Y. The initialization of Channels X and Y are indicated in the second column as "0x" and "0y," respectively, and the third column (Global Counter Window) indicates that the initialization sequence each channel should complete in about four to five milliseconds (4-5 ms). If the initialization sequence for the respective channel completes within the predicted window, then a first particular model check value is applied and if not, then a second particular model check value is applied.

The second and third rows of Table 1 are described in more detail. In the second row, the supervisory initialization sequence, which is directed by a scheduler (e.g., task scheduler 120 in FIG. 3), executes a trigger to initialize Channel X. Channel X is predicted to begin its initialization 4-5 ms after the system begins initialization. Since the global counter is operating at 500 KHz, the counter will increment by 2000 after 4 ms has elapsed and by 2500 after 5 ms has elapsed. In hexadecimal notation, 2000 is represented as 0x07D0; 2500 is represented as 0x09C4. Accordingly, when the system is operating and the global time counter initial value 206 is captured, it is predicted that Channel X will begin initialization when the global time counter is between (Init+0x07D0) and (Init+0x09C4). Along the same lines, with respect to the third row of Table 1, it is predicted that Channel Y will begin initialization when the global time counter is between (Init+0x07D0) and (Init+0x09C4). During subsequent operation of the embedded system the actual global time counter will be captured and stored when the system is initialized. If the Channel X initialization begins within 4-5 ms, then a value of 0x33CC will be applied as a model check value or used in an algorithm to produce the model check value. Conversely, if the Channel X initialization fails to begin within the predicted time, then the inverse value, 0xCC33, will be applied as the model check value or used in an algorithm to produce the model check value. Similarly, the value 0xAA55 will be applied as a model check value or used in an algorithm to produce the model check value if Channel Y begins initialization in 4-5 ms, and if not, the inverse value, 0x55AA, will be applied as the model check value or used in an algorithm to produce the model check value. Other values could of course be used, but the values described herein convey some of the principles of operation of a safe scheduler for deterministic application.

The fourth row of Table 1 indicates a supervisory event marking the time that the safety module initialization completes. The safety module initialization is predicted to complete 11-12 ms after the initialization begins. Based on the 500 KHz rate of the global time counter, the time counter will increment 5500 (0x157C) counts over 11 ms, and 6000 (0x1770) counts over 12 ms. If the safety module initialization sequence completes within the predicted time, the value 0x0011 will be applied as a model check value or used in an algorithm to produce the model check value and if not, the inverse value, 0x1100, will be applied as the model check value or used in an algorithm to produce the model check value.

In the fifth and sixth rows of Table 1, a first supervisory event (1s) monitors and verifies a first event for Channel X (1x) and a first event for Channel Y (1y). The completion of the channel initialization events in this embodiment is precise. Accordingly, Table 1 does not indicate time windows, but instead, actual offset values are used as the model check value or used in an algorithm to produce the model check value. The offset values are derived from the actual time count values from events 0x and 0y, respectively, which represent the values of the global time counter when the channel initialization commenced. Stated differently, Channel X initialization in this embodiment is predicted to take 14.848 ms, which equates to 7424 counts (i.e., 0x1 D00 counts) of the global time counter. The global time counter value when Channel X initialization is triggered is captured in row 2 of Table 1. It is predicted that Channel X initialization will complete exactly 14.848 ms after Channel X initialization begins. Similarly, Channel Y initialization is predicted to complete 14.848 ms (i.e., 7424 counts; 0x1 D00 counts) after the Channel Y initialization is triggered.

The values illustrated in rows 7 to 35 of Table 1 can be understood in similar fashion to the description of rows 1-6. In some cases, actual values offset from a particular event are precisely predicted. In other cases, offsets are predicted to fall within a window or range. Some of the values loaded in Table 1 represent offset values derived from the global time counter. Other values represent the data generated by functional modules, ranges of values produced by functional modules, and the like.

For example:

In row 7 of Table 1, at supervisor event 2s, a Channel X encoder value is reported at 10.752 ms to 11.424 ms (i.e., 0x1500 to 0x1650 counts) after the 1x event (i.e., Channel X initialization complete).

In row 8 of Table 1, at supervisor event 3s, a Channel X PWM output value is reported at 11.424 ms to 12.448 ms (i.e., 0x1650 to 0x1850 counts) after the 1x event (i.e., Channel X initialization complete).

In row 9 of Table 1, also at supervisor event 3s, a Channel Y encoder value is reported at 10.752 ms to 11.424 ms (i.e., 0x1500 to 0x1650 counts) after the 1y event (i.e., Channel Y initialization complete).

In row 10 of Table 1, at supervisor event 4s, a Channel Y PWM output value is reported at 11.424 ms to 12.448 ms (i.e., 0x1650 to 0x1850 counts) after the 1y event (i.e., Channel Y initialization complete).

Rows 11 and 12 of Table 1 are associated with supervisory events 5s and 6s, respectively, wherein requests are made by the supervisor to begin conversions in Channel X ADC_1 and ADC_2. The ADC_1 request is triggered between 9.728 ms and 9.888 msec (i.e., 0x1300 to 0x1350 counts) after the 4s event. The ADC_2 request is triggered between 9.728 ms and 9.888 msec (i.e., 0x1300 to 0x1350 counts) after the 5s supervisory event.

Row 13 of Table 1 is associated with supervisory event 6s, respectively, wherein requests are made by the supervisor to begin conversions in Channel X ADC_1 and ADC_2. The ADC_1 request is triggered between 9.728 ms and 9.888 msec (i.e., 0x1300 to 0x1350 counts) after the 4s event. The ADC_2 request is triggered between 9.728 ms and 9.888 msec (i.e., 0x1300 to 0x1350 counts) after the 5s supervisory event.

Evidence of predicted completion of a Channel X ADC_1 conversion is illustrated in row 14 of Table 1 in association with supervisory event 7s and Channel X event 6x. Since the architecture of the ADC is known, the precise timing for an end of conversion signal in the embodiment can be predicted. Furthermore, the range of acceptable values of the ADC_1 device can also be predicted. In some cases, the timing of the event and the values generated by the functional module associated with the event are combined into a single model check value. For example, in row 14, the ADC_1 conversion is predicted to end 24.576 ms (i.e., 0x3000 counts) after the conversion was triggered (i.e., Channel X event 4x). If the timing was accurate and if a safety module 200 (FIGS. 2-4) also validates an acceptable generated ADC value, then the model check value can be expected to be precisely set at a count value associated with event 4x plus 0x3000.

In rows 15-17, 21, 23, 24, and 27 of Table 1, certain events are associated with precise timing offsets from a particular triggering event. The events set forth in Table 1 and illustrated in the task scheduler model 202 include PWM feedback events and ADC conversion completion events, but other events associated with features of the embedded system are possible as well. Furthermore, for any one or more of the events, additional values or operating characteristics may be monitored and tested within the event analysis. Values generated or otherwise provided by a module associated with the event can be bounds-tested, direction-tested, cumulatively tested along with other values, and tested in other ways. Based on the timing and the testing criteria, the model check values can be generated or additionally or alternatively applied as a model check value or used in an algorithm to produce the model check value.

In rows 18-20, 22, 25-26, and 28-34 of Table 1, certain events are associated with a range of global time counter offsets. The events include trigger requests to commence ADC conversion events, PWM output events, ADC range test events, device reset/refresh events, encoder value test events, device feedback events, and other events.

At row 35 of Table 1, a supervisory event 23s is associated with a looped back return to a certain point in the task scheduler monitoring. In the embodiment of Table 1 and FIG. 5, monitoring of the task scheduler model returns back to supervisory event 2s.

Broadly speaking, the model of the embedded system may be created external to the embedded system or internal to the embedded system. That is, as discussed herein, the model values of Table 1 may be calculated externally and loaded in memory for use by the embedded system, or in addition or alternatively, the model values may be calculated by a safety module 200 of the embedded system during a "learn" phase. Furthermore, the modeled check values may be stored in a table (e.g., an array) format such as in Table 1, or the modeled check values may be stored in another way. In some cases, the modeled check values are produced by an algorithm such as a checksum algorithm, a CRC, or some other algorithm. In this way, modeled check values may be individually tested in some embodiments and accumulated for testing in other embodiments. Thus, sequence errors, timing errors, value errors, and other errors that occur in one or more of a plurality of embedded system tasks may be detected in real time.

After an embedded system model is generated, one or more check values from the model can be used to monitor the embedded system in real time and provide fast, deterministic detection of run time faults. The safety module 200 of FIGS. 2-4, for example, may be coupled in various ways to the embedded system. When errors are detected, an interrupt may be triggered in an embedded system processor. The interrupt handler associated with the fault detection interrupt triggered by the safety module 200 may take any desired course of action, and often, the action taken includes operating or shutting down the embedded system as safely as possible. For example, motors may be stopped abruptly or gradually, moving parts of functional modules may be immobilized, and alerts may be provided to operators or others associated with the embedded system. Other actions may also be taken.

With respect to the task scheduler model 202 of FIG. 5, the operations of a safety module 200 (FIGS. 2-4) are discussed with reference to Table 2.

TABLE 2

Model Check Value Table

| | Sup. Ev. | Ch. Ev. | Predicted CRC-8 value polynomial $P(x) = (x^7 + x^3 + x^1 + x^0)$ | Accumulated Modulus |
|---|---|---|---|---|
| 1 | 0s | — | Init = [0x3D04] | 0x3D04 |
| 2 | 0s | 0x | CRC-8 (0x33CC) = 0x0065<br>CRC-8 (0xCC33) = 0x0017 | 0x3D04 + 0x0065 = 0x3D69 |
| 3 | 0s | 0y | CRC-8 (0xAA55) = 0x005A<br>CRC-8 (0x55AA) = 0x0028 | 0x3D69 + 0x005A = 0x3DC3 |
| 4 | 0s | 1s | CRC-8 (0x0011) = 0x0030<br>CRC-8 (0x1100) = 0x0011 | 0x3DC3 + 0x0030 = 0x3DF3 |
| 5 | 1s | 1x | CRC-8 (0x1D00) = 0x001D | 0x3DF3 + 0x001D = 0x3E10 |
| 6 | 1s | 1y | CRC-8 (0x1D00) = 0x001D | 0x3E10 + 0x1D00 = 0x5B10 |
| 7-35 | | | Continued . . . | |

Table 2 represents a memory space arranged to store model check values corresponding the data of Table 1. Table 2 is truncated for brevity, but in an embedded system, model check value entries corresponding to each row in Table 1 would be produced.

In an embedded system embodiment having one or more features of the type illustrated in FIGS. 2-4, a safety module 200 is configured to monitor the embedded system. In this case, a CRC-8 value applies a certain polynomial algorithm (e.g., $P(x)=(x^7+x^3+x^1+x^0)$) to model values though many other types of CRC or other algorithm could be applied. Values based on the global time counter may be directly processed according to the CRC-8 algorithm. Values based on data produced by a functional module, data in a range, or other data will have corresponding known codes that are processed by the CRC-8 algorithm. For example, if a value falls within a first particular range, then a first code is applied. Alternatively, if the data does not fall within a first particular range, a second code is applied.

For example, in row 2 of Table 1 and row 2 of Table 2, a first value, 0x33CC is a coded value that indicates a Channel X initialization trigger is predicted to commence at 4-5 ms after the supervisory initialization event occurs. The coded value in a successful commencement of the initialization trigger will indicate 0x33CC if the Channel X initialization trigger is detected within the proper window. If the commencement is not detected within the proper time window, then the failure code, 0xCC33 will be entered. As found in Table 2, in the fourth column at row 2, the exemplary CRC-8 value of successful code 0x33CC is calculated to be 0x0065. In operation, the safety module will compare the model check value (i.e., 0x0065) to the check value calculated in real time based on the actual operation of the embedded system. If the safety module does not detect and calculate the CRC-8 algorithm output, 0x0065, then a failure will be detected.

In some cases, the safety module will also compare the model check value corresponding to the failure code with the check value calculated in real time. If these two values match, then a known failure type or known failed functional module will have been detected.

Subsequently, as the scheduler of the embedded system operates, additional events will be recognized, and new CRC-8 values corresponding to the events will be calculated. For example, in row 3 of Table 2, a second event corresponding to the initialization of Channel Y (i.e., also row 3 of Table 1) is processed. Here, a CRC-8 model check value corresponding to the "success" coded value, 0xAA55, is retrieved. The CRC-8 model check value in this example is 0x005A. In real time, the safety module 200 will detect whether or not the Channel Y initialization event occurs within the proper time window. If the detection does occur as expected, the real time individual CRC-8 value will match the model check value. If no match occurs, then an error will have been detected.

Some embodiments perform detection in another way. In column 4 of Table 2, a mathematic check value (e.g., a modulus value) is formed by mathematically accumulating in real time the incremental CRC-8 check values of a functioning embedded system. The accumulated values may be formed with a modulus algorithm or some other algorithm (e.g., math module 210 of FIGS. 3, 4). In the safety module 200, the accumulated modulus model check value is compared to the accumulated modulus check value calculated in real time and if a match is found, then processing continues. If no match is found, then a run-time fault is detected. This type of testing in a safety module may be performed quickly because a single real-time CRC-8 operation for each event may be carried out, and the comparison will determine if the current event has performed properly. In addition, the testing on the accumulated CRC-8 values will also indicate whether or not the events are occurring in the proper sequence. If the events are out of sequence, such as if an event is skipped or otherwise not processed, then a run time fault may also be detected.

The safety module 200 will continue functioning event-by-event. That is, the model check values found in rows 4-35 of Table 2 will be compared to real-time check values calculated as the embedded system executes. The safety module 200 will account for roll-over of the global time counter, perpetual looping of the task scheduler, and other aspects of the embedded system.

Alternatively, other mechanisms to validate the integrity of an embedded control system with safety module 200 are also contemplated. For example, in some cases, rather than performing event-by-event checks, a scheduler may be permitted to run an entire task loop before an accumulated check value is compared to a model check value. Two additional alternatives are now presented, but different and additional alternatives may also be implemented.

In a first alternative, certain model check value comparisons are made only periodically or made only in particular desirable patterns. For example, certain events in some cases may occur only during some passes of a task loop and not during other passes. A housekeeping task that is only executed every third pass of a task loop would be one example. A memory load balancing task that is executed every $256^{th}$ pass of the task loop would be another example. Many other examples are of course also possible. In these cases, the safety module 200 will include particular model check values and logic to apply the appropriate model check values in the associated comparison.

A second alternative may permit model check values to be selected based on dynamic conditions. For example, if a certain embedded control system having safety module 200 is responsible for an automotive system, the operation of the embedded system may be dynamically changed based on temperature, rain, daylight, automotive speed, or some other variables. In these cases, the safety module 200 may be flexible enough to detect the dynamically changed condition and select particular model check values and logic to apply the appropriate model check values in accordance with the changed condition.

Figure 6:
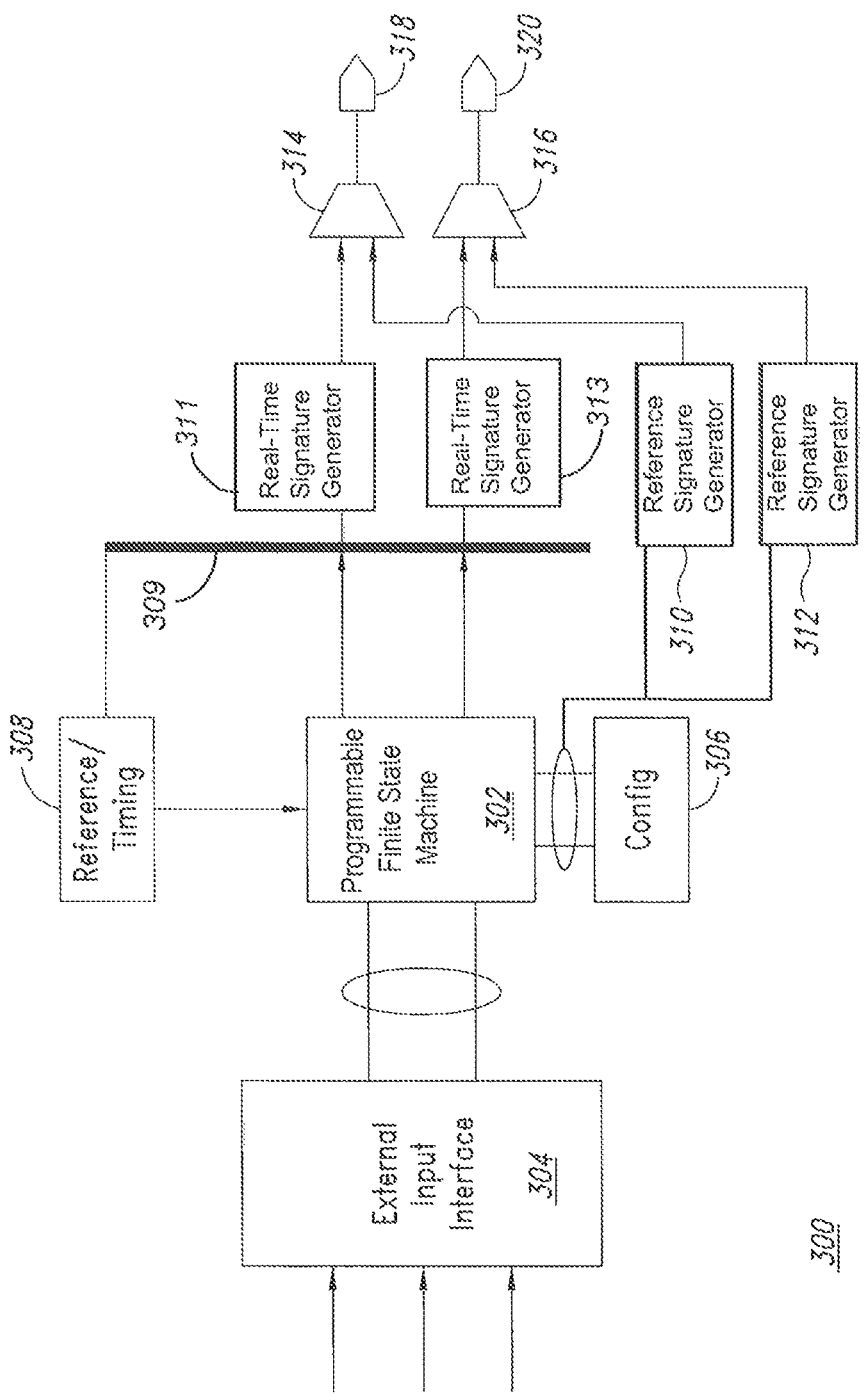
FIG. 6 is a block diagram embodiment of another safety module.

FIG. 6 is a block diagram embodiment of another safety module 300. In the embodiment, which may include aspects of other safety modules described herein, a programmable finite state machine (FSM) 302 directs operations. Values corresponding to particular events are passed into the safety module 300 via an external input interface 304. The externally input values may correspond to event triggers, functional module data, or other values.

A reference/timing module 308 directs the timing execution of operations in the FSM 302. The safety module 300 is a synchronous device. Accordingly, clock cycles and thus all operations within the safety module 300 are predictable.

The reference/timing module 308 presents a timing threshold 309 that values from the FSM 302 are passed through. The timing threshold 309 may be configured in hardware, software, or hardware and software. In the embodiment of FIG. 6, the values pass through the timing threshold 309. That is, as particular events are directed, received, or otherwise processed in the FSM 302, timing characteristics are assigned to the event. The timing characteristics are associated with the actual, real-time behavior of the embedded system. The timing threshold 309 will store the assigned timing characteristics as individual or accumulated time stamps. Subsequently, mathematic check values may be calculated by real-time signature generators 311, 313 using at least some of the plurality of the time stamps.

The safety module 300 is further configured to monitor the sequence of events directed by the FSM 302. In some cases, the actual sequence is monitored within the FSM 302, and in other cases, the sequence is monitored as event data is passed through the timing threshold 309.

Two processing channels are illustrated in FIG. 6 as passing into the FSM 302, but more or fewer channels are also considered. Two corresponding channels are illustrated in FIG. 6 as passing from the FSM 302 to the timing threshold 309. Each of two further corresponding data paths pass from the timing threshold 309 to an associated real-time signature generator 311, 313. The real-time signature generators 311, 313 may generate a signature from timing data, event data, sequence of events data, or some combination of timing, event, and sequence data. After a signature is generated by real-time signature generator 311, 313, the signature is passed to a respective comparator 314, 316. Values from signal generators 310, 312 produce model check values that are compared to real-time data passed from the timing threshold 309, and associated outputs from the comparators 314, 316 are passed to output nodes 318, 320, where particular action in the embedded system can be directed.

In some cases, the directed actions include generating an interrupt to a processing device, which alerts the processing device to a detected system fault. In other cases, the directed actions may include operations such as triggering analog-to-digital (A2D) conversions in an A2D converter, retrieving conversion values from an A2D converter, and other operations.

The signal generators 310, 312 may include hardware circuits, software, or hardware and software. The signal generators are configured to produce and store model check values based on a plurality of model time stamps. Each model time stamp represents a value of the reference/timing module 308 taken or predicted at a certain point in a behavior model of FSM 302. In some cases, the model check values are pre-calculated and stored in memory. In other cases, the model check values are computed in real-time.

Configuration logic 306 may include memory, circuitry, and the like. The configuration logic 306 allows for automatic, manual, or programmatic reconfiguration of the safety module 300. In some cases, the reconfiguration may be dynamic. That is, the reconfiguration may occur as the embedded system is operating, and a new sequence or new model check values are created.

In one example, the configuration logic 306 is arranged to update the FSM 302 and the signal generators 310, 312. As discussed herein, the FSM 302 may direct mathematic calculations that are performed on values retrieved from the reference/timing module 308. Corresponding mathematic calculations are performed in the signal generators 310, 312, and the mathematic calculations may be cyclic redundancy check (CRC) algorithms, checksum algorithms, or some other hash algorithm. The configuration logic 306 may update the mathematic algorithms directed by the FSM 302 and included in the signal generators 310, 312.

The programmable FSM 302 is associated with a non-transitory computer readable medium such as a memory (not shown). The FSM 302 directs the execution of a plurality of tasks of the embedded system. It is recognized that the safety module 302 is configured to detect sequence errors in the execution of a plurality of tasks, timing errors in the execution of a plurality of tasks, generated value errors in the execution of a plurality of tasks, and other errors.

Figure 7:
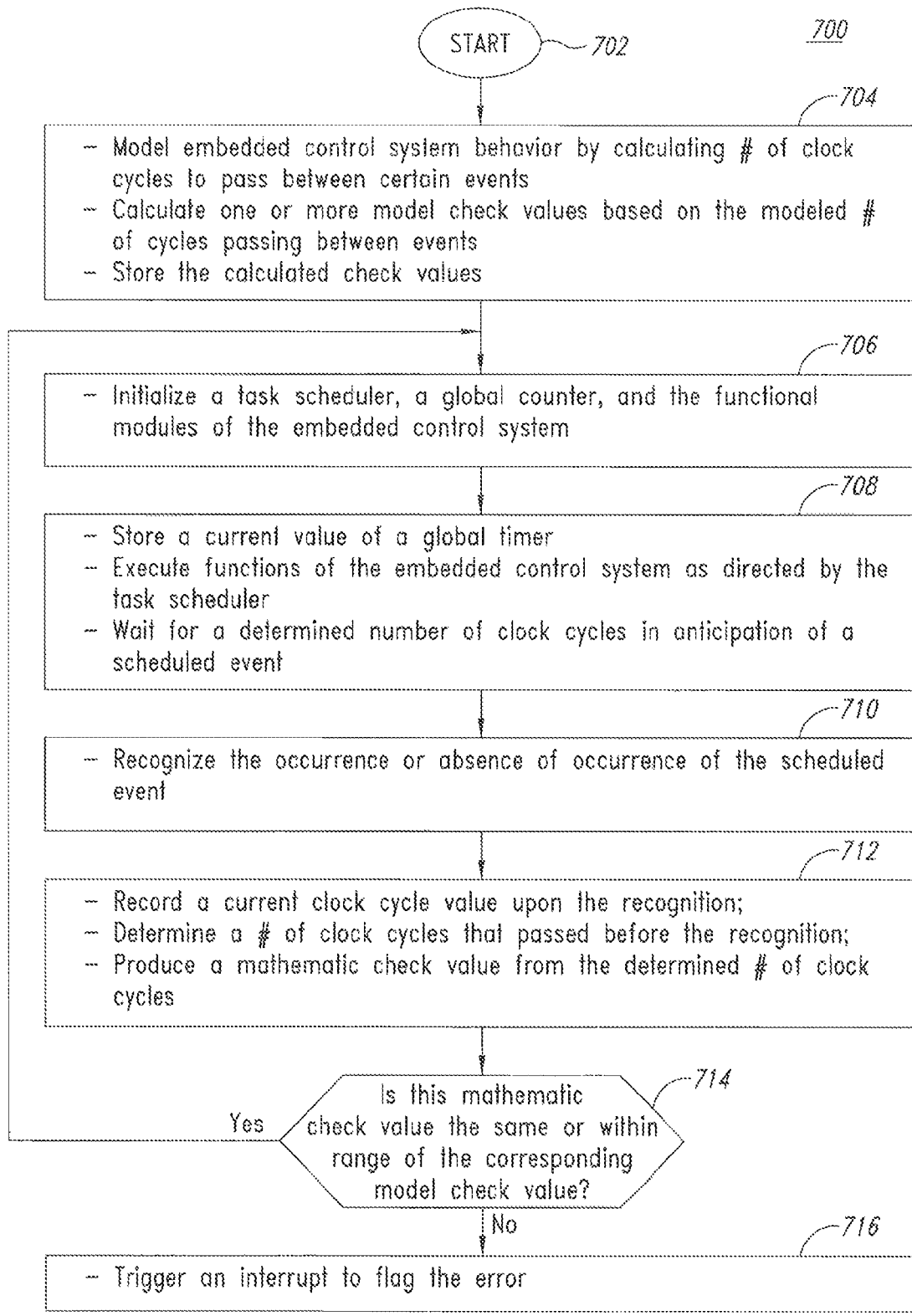
FIG. 7 is a flowchart representing operations of a safety module embodiment.

FIG. 7 is a flowchart 700 representing operations of a safety module embodiment. In the flowchart 700, operations commence at 702. At 704, an embedded system is modeled. The modeling may include identifying certain events and calculating, measuring, or predicting the number of clock cycles of a global time counter that will elapse between the events. Based on the number of counts (i.e., clock cycles), one or more model check values are calculated. The calculation may include one or more mathematic algorithms such as checksums, CRC's, modulus calculations, and others. The calculated check values are then stored and made accessible to a safety module of the embedded system. The modeling may occur within the safety module, using functions of other embedded system modules, or by an external system. One optional feature of the modeling in many embedded system embodiments is that the model check values may be updated. The updates may occur automatically or manually.

At 706, a task schedule, global counter, and functional modules are initialized. In some cases, the initialization includes a cold-start initialization of the embedded system and its associated modules. In other cases, the initialization may be no more than resetting some variables and other hardware or software logic after a completed task loop.

The monitoring functions of the safety module 300 are represented at 708. A current value of the global timer is stored, for example in a temporary register. The task scheduler of the embedded system continues to operate and directs the functional modules to perform assigned tasks. The safety module will wait for determined number of clock cycles for a scheduled event to occur.

At 710, the safety module 300 recognizes the occurrence or absence of occurrence of a particular event. For example, with respect to FIGS. 2-5 and Tables 1 and 2, certain functional modules such as ADC controllers commence precisely predictable operations. An indication that the precise event has completed is generally and reliably detected when the embedded system is functioning properly. Conversely, if a an event does not occur when expected, it can be presumed that an error such as a run-time fault has occurred.

At 712, the global counter is interrogated, and a current clock cycle value is captured. The counter/time value represents the point in time when the occurrence of absence of occurrence of the event is detected. The number of clock cycles that have elapsed between a previous event and the recognition is calculated, and a mathematic check value is produced. The determination of the number of elapsed clock cycles may include handling clock rollover and other features of the particular system.

A comparison is performed at 714. If the mathematic check value is the same or acceptably close to the model check value, then the safety module continues back to the initialization act of 706. Alternatively, if the comparison is determined to have failed, an interrupt is triggered to flag the detected run time fault.

In the foregoing description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The various embodiments described above can be combined to provide further embodiments. Aspects of the embodiments can be modified and changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An embedded controller, comprising:
a functional logic module interface;
a task scheduler module arranged to schedule a finite number of events of one or more functional logic modules accessible via the functional logic module interface, wherein the finite number of monitored events include a trigger of at least one analog to digital conversion, a received indication of a completed analog to digital conversion, and an interaction with at least one timer; and
a safety module, the safety module arranged to:
monitor the finite number of events;
incrementally create a mathematic check value, each increment based on at least one of the finite number of monitored events;
compare the mathematic check value to a pre-computed model check value; and
set a test result value based on the comparison.

2. The embedded controller of claim 1, comprising:
a memory interface, the memory interface configured to read data from and write data to an attachable memory, the data including the pre-computed model check value.

3. The embedded controller of claim 1 wherein the pre-computed check value is a sequence of pre-computed check values, each one of the sequence representing an increment of the pre-computed model check value.

4. The embedded controller of claim 1 wherein the mathematic check value is created as a cyclic redundancy check (CRC) check value, the CRC check value created by mathematically combining an accumulated CRC check value with an incremental value CRC check value.

5. The embedded controller of claim 1 wherein incrementally creating the mathematic check value with the safety module includes:
retrieving a determined number of iterations m;
configuring a variable n to incrementally count from 1 to m, each count associated with one iteration;

detecting an nth one of the finite number of monitored events during each iteration;

recording a time value associated with the nth one of the finite number of monitored events; and performing a linear function on the recorded time value associated with the nth one of the finite number of monitored events.

6. The embedded controller of claim 5 wherein the linear function is a cyclic redundancy check (CRC).

7. The embedded controller of claim 1 wherein the functional logic module interface is arranged to communicate motor control commands.

8. The embedded controller of claim 1 wherein the task scheduler is configured to carry out functions of a finite state machine.

9. The embedded controller of claim 1 wherein the safety module is configured to cause an interrupt when the mathematic check value does not equal the pre-computed model check value.

10. A safety system method to monitor faults in an embedded control system, comprising:

modeling the embedded control system to produce one or more model check values, the modeling including calculating how many clock cycles will pass between an initialization time point and at least one event time point, the initialization time point being a certain point in an initialization function of a scheduler in the embedded control system, the at least one event time point being an expected number of clock cycles to pass before an event occurs;

initializing the embedded control system;

storing a current clock cycle counter value at a certain point in the initialization;

recognizing an occurrence or absence of occurrence of a finite number of scheduled events, wherein the finite number of scheduled events include a trigger of at least one analog to digital conversion, a received indication of a completed analog to digital conversion, and an interaction with at least one timer;

recording a current clock cycle value upon the recognition; and producing a mathematic check value from the clock cycle value stored at the certain point in the initialization and the clock cycle value recorded upon the recognition;

comparing the model check value to the mathematic check value; and taking an action based on the comparison.

11. The safety system method of claim 10, comprising:
anticipating a scheduled event wherein the anticipation of the scheduled event includes waiting while the embedded control system directs functions of a system under control.

12. The safety system method of claim 11 wherein the action taken includes anticipating another scheduled event.

13. The safety system method of claim 10 wherein the expected number of clock cycles is a range of clock cycles.

14. The safety system method of claim 10 wherein the action taken includes directing an interrupt, the interrupt configured to detect a runtime fault in the embedded control system.

15. A non-transitory computer readable medium having computer executable instructions thereon that, when executed, cause a processor to monitor an expected behavior of an embedded control system, the monitoring including acts comprising:

storing a model check value, the model check value based on a plurality of model time stamps, each model time stamp representing a value of a counter taken at a certain point in a model of a finite state machine arranged to direct operations of a system under control;

initializing the embedded control system;

executing a plurality of tasks, the tasks directed by the finite state machine, wherein the plurality of tasks includes a trigger of at least one analog to digital conversion, a received indication of a completed analog to digital conversion, and an interaction with at least one timer;

storing a plurality of time stamps associated with an actual behavior of the embedded control system;

calculating a mathematic check value using at least some of the stored plurality of time stamps;

comparing the mathematic check value with the model check value; and directing an action in the embedded control system based on the comparison.

16. The non-transitory computer readable medium of claim 15 wherein the act of calculating the mathematic check value includes a further act, comprising:

executing a cyclic redundancy check algorithm.

17. The non-transitory computer readable medium of claim 15 wherein the act of directing the action in the embedded control system includes further acts, comprising:

storing data associated with a detected system fault; and
triggering an interrupt in the processor.

18. The non-transitory computer readable medium of claim 15 wherein the act of executing the plurality of tasks includes acts comprising:

storing data associated with a detected system fault;
triggering an analog-to-digital (A2D) conversion in an A2D converter;
receiving an A2D conversion completion indication; and
retrieving a converted value from the A2D converter.

19. The non-transitory computer readable medium of claim 15 wherein the act of comparing the mathematic check value with the model check value includes acts comprising:

detecting a sequence error in the execution of the plurality of tasks or detecting a timing error in the execution of the plurality of tasks.

* * * * *